Feb. 15, 1938.　　　D. LANTINBERG ET AL　　　2,108,067
MACHINE FOR MOLDING CHOCOLATE ARTICLES AND THE LIKE
Filed Dec. 28, 1934　　　4 Sheets-Sheet 1
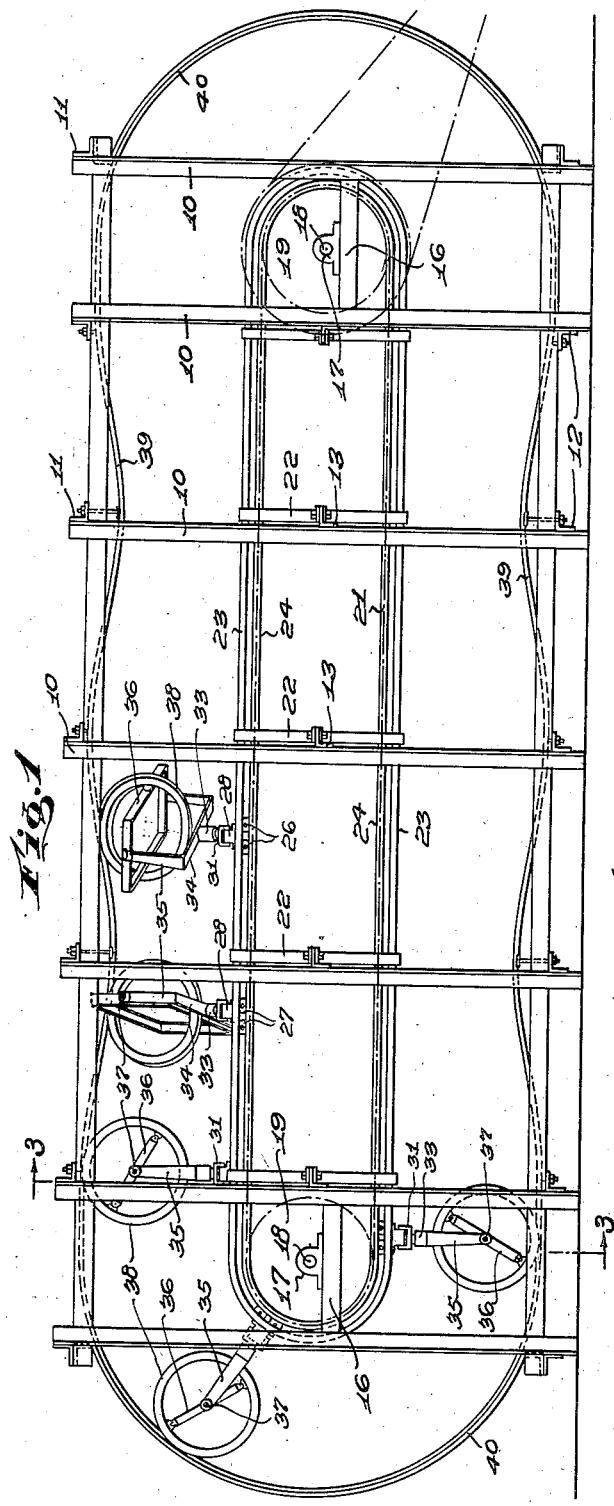

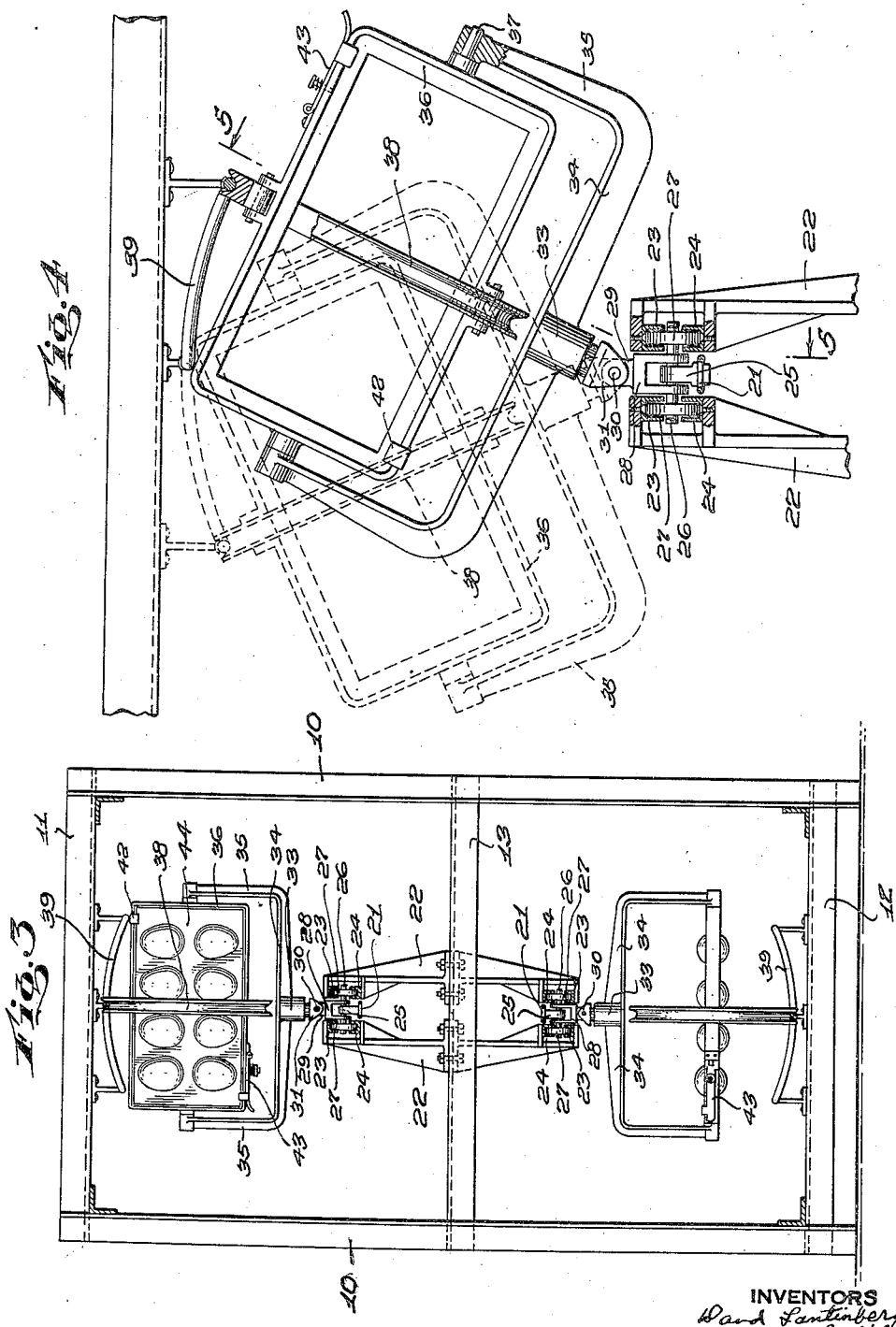

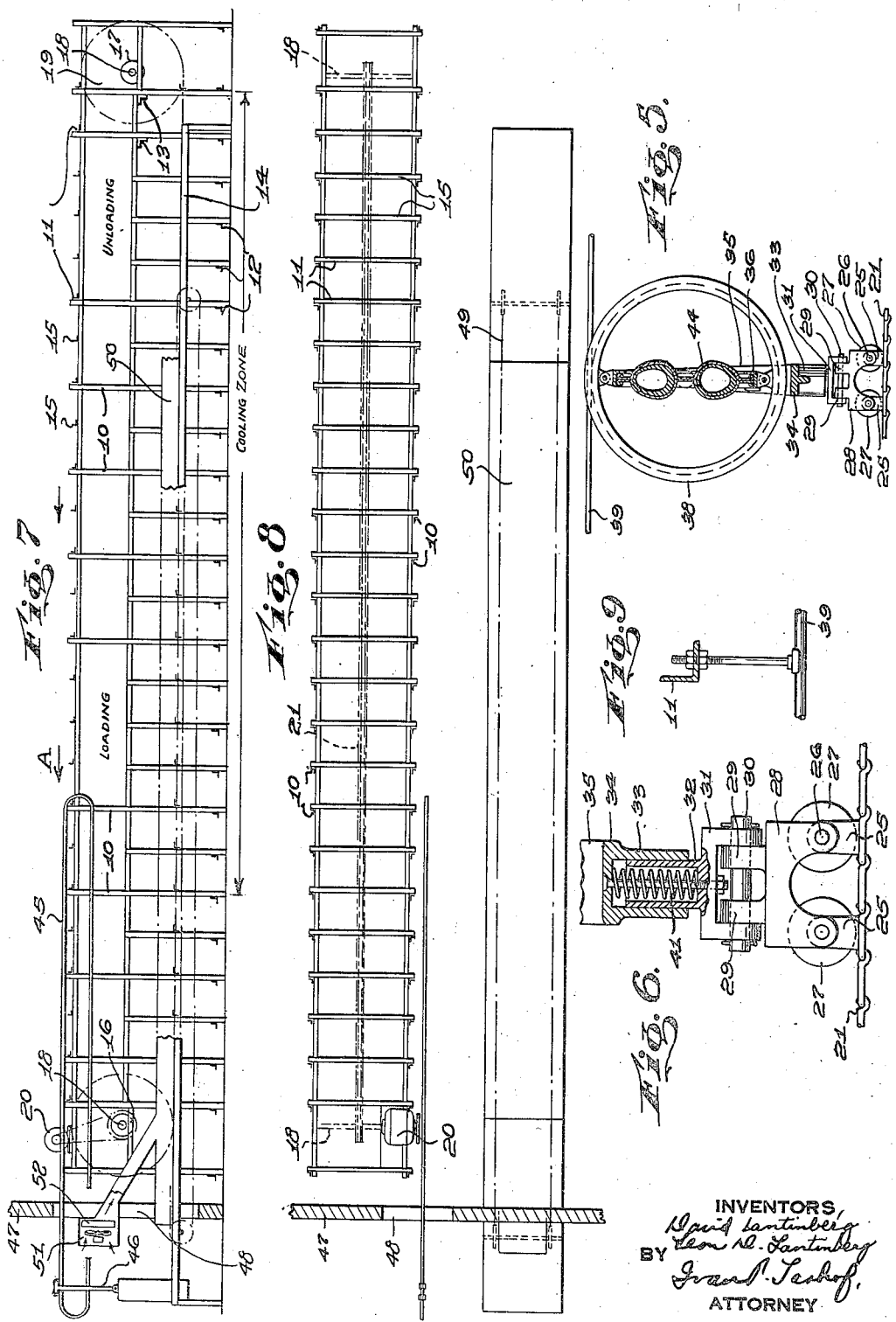

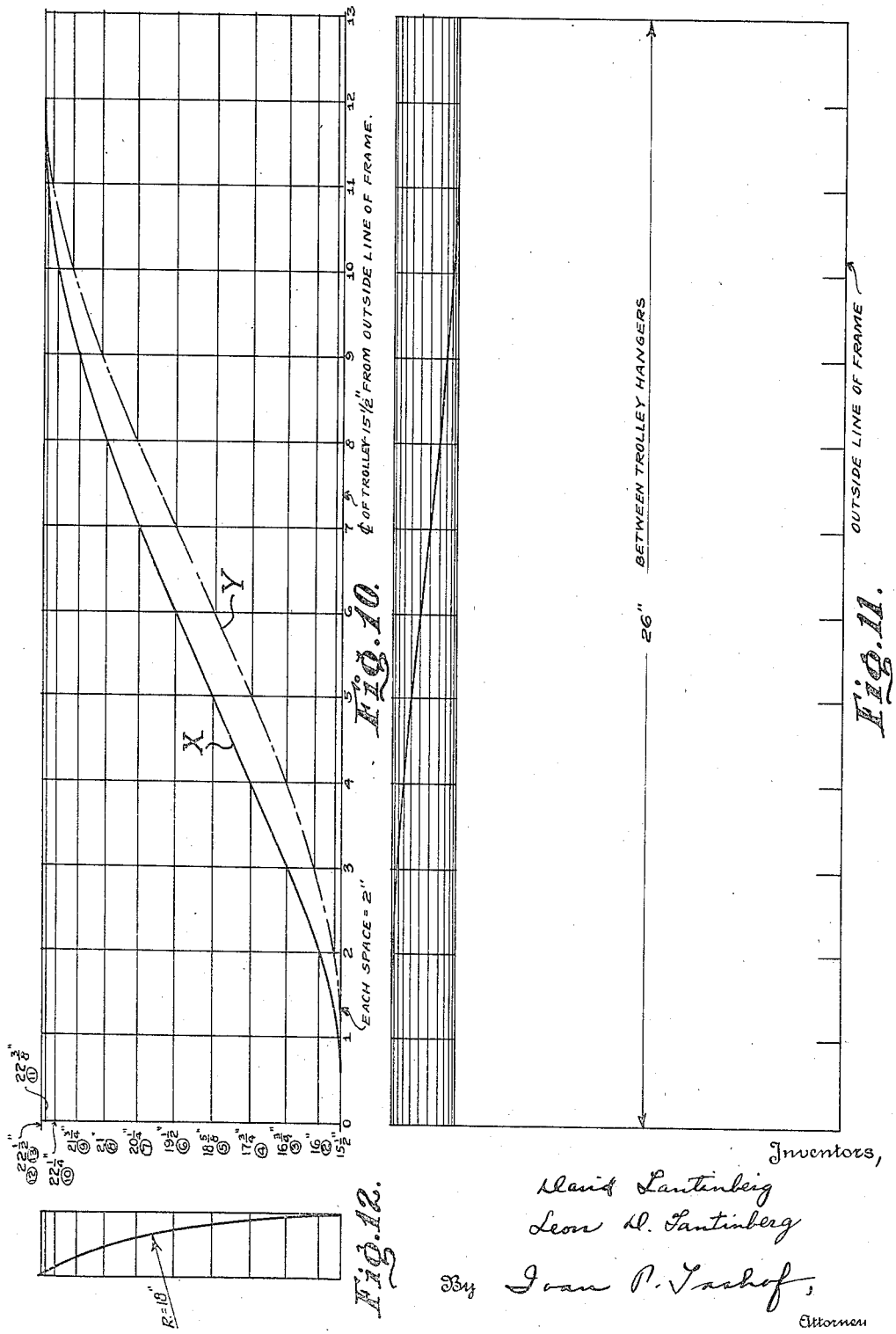

Patented Feb. 15, 1938

2,108,067

UNITED STATES PATENT OFFICE 2,108,067

MACHINE FOR MOLDING CHOCOLATE ARTICLES AND THE LIKE

David Lantinberg and Leon D. Lantinberg, Brooklyn, N. Y., assignors to N. D. Q. Specialty Corporation, Brooklyn, N. Y., a corporation of New York Application December 28, 1934, Serial No. 759,584

11 Claims. (Cl. 107—8)

This invention relates to molding and has special reference to the molding of articles which are desired to have their surfaces fit tightly against the mold walls.

More particularly the invention relates to the molding of hollow candies and other like articles.

Machines have been devised for the molding of hollow candies, but such machines had the tendency to produce irregularities in the distribution of uniform thickness of the material being molded within the mold, so that there was a constant tendency to produce thin or cracked spots in the molded material. Such thin spots or cracks could not be detected without breaking the molded article open and thus destroying it. Consequently, such imperfect articles were shipped and, when subjected to the shocks and temperature changes of shipment, arrived at their destination in broken and unsaleable condition.

For example, fractures may exist in chocolate hollow figures which are not visible to the naked eye and only become apparent when the figures reach a cold climate or are subjected to shock.

Some of the machines previously used for this purpose included a basket or cylinder containing molds wherein the material to be molded was placed. This basket was tilted alternately in one direction and the other and at the same time rotated, the tilting being effected by guides which gradually raised the ends of the baskets in alternation and suddenly dropped the raised ends. There was thus a series of shocks, from such sudden dropping, to which the molds were subjected. Further, the molds were necessarily more or less loose in the baskets and consequently clashed together resulting in the molded material being subjected to further shocks. Much damage, therefore, resulted and imperceptible fractures occurred which further developed during transit of the goods.

It is one of the objects of the present invention to provide an apparatus of this character by which a distribution of the molded material of proper thickness against the wall of the mold will always be attained, the particular thickness being, of course, dependent on the character and/or shape of the figure being molded so that no thin spots or incipient cracks will be formed in such article.

A second important object of the invention is to provide an apparatus for effecting a combined rotary and oscillatory movement of a mold for this purpose wherein such movements will both be accomplished without shock or jar and in a gentle and regular manner.

A third important object of this invention is to provide a novel and improved method of molding hollow articles in such manner as to eliminate shocks and jars during the molding and yet to accomplish accurate molding of such articles.

A fourth important object of this invention is to provide a novel apparatus for handling the molds for the production of hollow molded candies and other article.

With the above and other objects in view the invention consists in general of certain novel details of construction and combinations of parts hereinafter fully described and illustrated in the accompanying drawings, as well as a novel method or process also fully described, both being set forth in the appended claims.

In the accompanying drawings, like characters of reference indicate like parts in the several views, and:—

Figure 1 is a substantially diagrammatic elevation of a machine embodying this invention and adapted to carry out the method hereinafter set forth.

Figure 2 is a plan view thereof.

Figure 3 is an enlarged section on the line 3—3 of Fig. 1.

Figure 4 is a still further enlarged view of the upper part of Fig. 3.

Figure 5 is a section to a somewhat reduced scale on the line 5—5 of Figure 4.

Figure 6 is an enlarged detail section of the lower part of Fig. 5 on the same line as that on which Fig. 5 is taken.

Figure 7 is a diagrammatic side view of the assemblage of the machine of the present invention with means for positioning the molds adjacent the carriage or supporting frame therefor and a heater for heating the molds after they have been taken from the carriage or carrying frame.

Figure 8 is a side view of the assemblage shown in Fig. 7.

Figure 9 is a view showing a means for supporting one of the tracks used herewith.

Figure 10 is a diagrammatic plan view showing the center curve of the sinuous track used herewith.

Figure 11 is a side elevation of the arrangement shown in Fig. 10.

Figure 12 is a view showing the radius of the mold carrying frame and the curve which is generated when using such a radius and employing a trolley curve of the type herein set forth.

The present invention in its broadest form is directed to a method of casting hollow articles in molds comprising rotating the mold containing a quantity of moldable material insufficient to fill the mold and simultaneously with such rotation, oscillating said mold in a plane transverse to the axis of its rotation gradually between limits. Preferably reversal of such oscillations are prevented. In the more limited aspect of the present invention, the mold is caused to move at one part along a sinuous path. Preferably, said path when projected on a plane surface constitutes a trochoid.

The present invention in one of its forms is directed to a method of casting hollow articles, such as chocolate, comprising distributing the material within the mold by simultaneously rotating and oscillating the mold while inhibiting shocks which will cause fractures in the material being molded.

From the standpoint of the apparatus employed, the invention comprises a main track, a sinuous track arranged in substantially concentric relation to the main track, and a mold carrier supported on one of said tracks and having a rolling element engaging the other track.

In the embodiment of the mechanism for carrying out the invention, as herein set forth, both in structure and method, there has been shown in the accompanying drawings a series of spaced frames each consisting of laterally spaced vertical members 10 connected at their tops by transverse members 11, at points adjacent their lower ends by transverse members 12 and centrally between these tranverse members by transverse members 13. These frames are connected at their upper and lower corners by longitudinal frame members 14 which may, as shown in Figs. 7 and 8, be additionally braced by transverse members 15. Intermediate the tops and bottoms of these frames are other longitudinal members 16, certain of the frames terminating upwardly at said members 16. As shown in Figs. 1 and 2, the longitudinal members 16 may be omitted except between the pairs of frames at each end of the apparatus when they carry bearings 17 in which are supported shafts 18 carrying wheels 19, the latter being preferably sprocket wheels. On one shaft 18 is mounted the rotor of a motor 20 and around the sprockets 19 is trained a belt 21, preferably in the form of an endless chain.

Fixed on the transverse members 13 are laterally spaced brackets 22 carrying at their outer ends confronting outer trackways 23 and inner trackways 24. Connected to the chain 21 at spaced intervals are trucks each including standards 25 each carrying a transverse shaft 26, each of which has a pair of wheels 27 rolling between the trackways 23 and 24 of the respective brackets 22. Yoke brackets 28 (best seen in Fig. 6) connect adjacent pairs of standards 25, being mounted on the shafts 26. Each of these yoke brackets carries a pair of spaced bearing lugs 29 wherethrough extends a shaft 30. Mounted on this shaft 30 is a fork 31, it being noticed that the shaft 30 extends longitudinally of the chain 21 so that the fork 31 may rock transversely of the path of said chain. Each fork 31 supports a hollow cylindrical lug 32 whereon telescopes a tubular lug 33 forming the central support of a yoke having a transverse member 34 and a pair of arms 35, between which is pivoted a rotatable frame 36 having stub shafts 37 which are journalled in the outer ends of the arms 35 as clearly shown in Fig. 4. Surrounding the central portion of the frame 36 is a grooved wheel 38 which engages a track having sinuous portions 39 and semicircular end portions 40, supported from the transverse members 11 and 12. A spring 41 in each telescopic pair of sleeves 32 and 33 serves to hold the grooved wheel 38 constantly in contact with the track composed of the portions 39 and 40.

The frame 36 is provided with suitable means, such as the fixed clip 42 and spring clip 43 to hold a mold 44 having suitable cavities to produce the desired configuration of the articles to be formed by the apparatus.

Referring particularly to Figs. 7 and 8, it will be seen that the complete machine, as preferably constructed, includes an introductory zone of entry end having a guide track 45 from which the molds 44 may be suspended by hangers 46 so that they may be manually moved therealong to be placed in the frames at the section indicated as "Loading" in Fig. 7 and thus be carried through the apparatus so that these molds are subjected to a uniform rotary movement and at the same time are given a uniform oscillation while travelling between the ends of the tracks, the first track over which the wheels 27 travel constituting the main or primary track, and the member 39 constituting the means for oscillating the yoke composed of the transverse portion 34 and arms 35, while the frame is being rotated in its movement through the apparatus.

It is to be noted that the main track, as here shown, consists of two parallel portions connected at their ends by semicircular portions and that the outer track, in a somewhat similar manner, consists of two longitudinally extending portions connected at their ends by semicircular portions parallel to the semicircular portions of the main track. However, the longitudinal portions of the outer track, which is preferably a rod of circular cross-section, are arranged in a manner to form a sinuous curve concentric to the axis of the shaft 30 and thus substantially concentric to the main track. It will be seen from Figs. 10 and 11 that these curved portions have the form of a sinusoid or trochoid having, when developed in a plane, the general formula:

$X = a$ (rad. $u$) $-b$ (sin $u$) where the curve is formed by rolling a circle along a straight line and $X =$ the distance of a point of the curve from the normal.

$a =$ the radius of the rolling circle.

Rad. $u =$ the angle through which the circle has rolled, and $b =$ the distance of the point describing the curve from the center of the circle, as shown on page 152 of the Mechanical Engineers Handbook of Lionel S. Marks, 1st ed., 5th impression, The McGraw-Hill Book Co. Inc. 1916.

Of course, while such a curve is here shown, other forms of sinuous curves may be used, the main object being to obtain a lateral smooth rocking of the mold while the same is being rotated so that no shock or jarring takes place.

Referring now particularly to Figs. 7 and 8, it will be seen that the track 45 is located at one side of the main frame structure and extends through a wall 47 having an opening 48 therein through which the molds 44 may pass. An operator stands to the right (as here shown) of this wall and, as the molds are fed inward to him, removes them and places them in the frames 36, the location of this operation being indicated by the word "Loading". The molds then move in the direction of the arrow A, pass around and beneath the front wheel 19 and back through a portion of the machine, indicated by the words "Cooling Zone" to a part at the rear indicated by the word "Unloading", at which point the molds are detached from their supporting frames, opened and emptied. The cooled molds are then placed on a return conveyor 49 which runs through a heater casing 50 supplied with hot air by a fan 51 blowing air through a suitable heating element 52. The conveyor is arranged to pass through the wall 47 so that the molds arrive at the place for filling in a suitable heated condition and ready for reuse.

It is to be observed that the method of distributing the material within the mold is such as to accomplish such distribution by simultaneously rotating and oscillating the mold employed, the oscillation being without shocks or without changes such as are disclosed in the prior art.

It is also to be observed that the apparatus shown and described is one in which such method will be readily carried out. However, it is not desired to confine the invention to the exact apparatus herein shown, since it is obvious that changes may be made therein accomplishing the same results. For instance, the inner track may be sinuous and the outer rectilinear, or both may be sinuous.

Further, the track portions 39 and 40 may be spring actuated, and in that case the telescopic places 32 and 33 may be replaced by a fixed member. While this arrangement has been found to be not quite as satisfactory as the construction set forth, it may be used. It is, of course, obvious that the track portions 39 and 40 may take different structural shapes from that shown in the drawings and herein described.

In the form of the apparatus shown in Figs. 1 to 4 inclusive, the refrigerating element is placed at the top of the framework 10. This is merely a preferred location of the refrigeration elements, as obviously they can also be placed elsewhere, and in the form of the apparatus shown in Figs. 7 and 8, the cooling elements are placed adjacent the floor of the apparatus.

In the form of the apparatus shown in Figs. 1 and 2, the entire apparatus is placed in a room which is cooled to about 45° F. In the form of apparatus shown in Figs. 7 and 8, only a portion of the apparatus is enclosed in a cooling room. It may be stated that the temperature of the chocolate as it enters in either form of the apparatus varies between 80° and 85° F. Obviously, the time that the molds take to traverse their course and to cool their contents will vary according to the character of the material being cast and the results desired. In a machine built in accordance with Figs. 1 and 2, the molds pass through the cooling room for a period of about six minutes. This means usually that the molds pass over their circuit about five or six times for completion of refrigeration or casting (cooling).

In the form of the machine diagrammatically shown in Figs. 7 and 8, the contents of the molds are perfectly cooled and set in one circuit of the molds when loading to the unloading position, thereby giving a truly continuous process, insuring high capacity.

Figs. 10 to 12 inclusive show the trolley curve as plotted from dimensions taken from a working machine. In Fig. 10 the spacing along the abscissa is two inches, so as to give an equal number of spaces in the 26 inches of length between the beginning and end of one complete compound curve. The ordinates are plotted from the outside line of the casting unit frame. The curve marked X plotted from the actual dimensions taken from the casting machine, has some humps in it, but this is because the actual curve of the trolley member was made by the cut and try method. Curve X is a substantially progressively uniform curve. The dot and dash curve Y represents what the curve should be if the trolley member were bent absolutely accurately to produce a progressively uniform trochoidal curve. It is within the province of the present invention to make the curve of the trolley member exactly in conformity with the dot and dash curve Y. In actual practice, the curve X represents the plan view development of the trolley curve. Fig. 11 is a side view development of the curve, and Fig. 12 shows the radius of the mold carrying frame, the mold pivoting along a straight line, as shown in the other figures of the drawings.

What is claimed is:—

1. In a casting apparatus, a main track, a sinuous track arranged in substantially concentric relation to the main track, a mold carrier supported on one of said tracks and having a rolling element engaging the other track, said mold carrier including a mold carrying frame around which said rolling element extends and which rolling element engages said sinuous track.

2. In a casting apparatus, a main track, a carriage movable along said track, a mold carrier pivoted to said carriage, a sinuous track having its axis concentric to the pivot of said carrier to the carriage, and a wheel on said mold carrier engaging said sinuous track.

3. In a casting apparatus, a main track, a carriage movable along said main track; a mold carrier including a yoke pivoted to said carriage and a mold supporting frame rotatably mounted between the arms of said yoke, a sinuous track extending along said main track with its center at a constant radial distance from the pivotal connection between the yoke and carriage, and a wheel surrounding said frame and peripherally engaging said sinuous track.

4. In a casting apparatus, a main track, a carriage movable along said main track, a mold carrier including a yoke pivoted to said carriage and a mold supporting frame rotatably mounted between the arms of said yoke, a sinuous track extending along said main track with its center at a constant radial distance from the pivotal connection between the yoke and carriage, a rolling element surrounding said frame and peripherally engaging said sinuous track, and spring means urging said rolling element into engagement with said sinuous track.

5. In a casting apparatus, a main track, a sinuous track arranged in substantially concentric relation to the main track, a mold carrier supported on one of said tracks and having a rolling element engaging the other track, said mold carrier including a mold carrying frame around which said rolling element extends and which rolling element engages said sinuous track, and spring means urging said rolling element into engagement with said sinuous track.

6. In a casting apparatus, a main track, a sinuous track arranged in substantially concentric relation to the main track, a mold carrier supported on one of said tracks and having a rolling element engaging the other track, said mold carrier including a yoke laterally oscillatable with respect to one of said tracks, a frame rotatable in the yoke and adapted to support a mold and having a circular wheel engaging the other track to rotate the frame, as the yoke moves along the first track, and spring means urging said rolling element into engagement with said sinuous track.

7. In a casting apparatus, a main track, a carriage movable along said track, a mold carrier pivoted to said carriage, a sinuous track having its axis concentric to the pivot of said carrier to the carriage, means on said mold carrier to rotate the same as it moves along said tracks, and spring means urging the last mentioned means into engagement with said sinuous track.

8. In a casting apparatus, a main track, a carriage movable along said track, a mold carrier pivoted to said carriage, a sinuous track having its axis concentric to the pivot of said carrier to the carriage, a wheel on said mold carrier engaging said sinuous track, and spring means urging said wheel into engagement with said sinuous track.

9. In a casting apparatus, a main track, a carriage movable along said main track, a mold carrier including a yoke pivoted to said carriage and a mold supporting frame rotatably mounted between the arms of said yoke, a sinuous track extending along said main track with its center at a constant radial distance from the pivotal connection between the yoke and carriage, a wheel surrounding said frame and peripherally engaging said sinuous track, and spring means urging said wheel into engagement with said sinuous track.

10. In an apparatus of the kind described, a frame work, a guide track having upper and lower parallel portions connected at their ends by semi-circular portions, carriages running on said track, a chain driving said carriages, a yoke pivoted on each carriage to oscillate laterally of the movement of said chain, a telescopic connection between each yoke and carriage, a spring in said telescopic connection urging the same to expanded position, a mold carrying frame rotatably mounted in said yoke, a grooved wheel surrounding said yoke, and a sinuous track wherewith said grooved wheel engages.

11. In a casting apparatus, a main track of such shape that all parts thereof lie in the same plane, a second track arranged in substantially concentric relation to said main track, said second track being of such shape that the projection of said second track on both the horizontal and vertical planes through an axis longitudinal to the main track will be of sinuous shape, a mold carrier substantially supported on one of said tracks and having a rolling and guiding engagement with the other track in order to impart to said mold carrier a combined rotary and a gentle and regular oscillatory movement through a plurality of vertical and horizontal planes about one of the ends of the mold carrier.

DAVID LANTINBERG.
LEON D. LANTINBERG.